Sept. 8, 1931.                F. H. LANE                1,822,226
   METHOD FOR DETERMINING OPTIMUM CURRENT STRENGTH IN THE
      ELECTRODEPOSITION OF RUBBER AND OTHER SUBSTANCES
                    Filed April 4, 1928
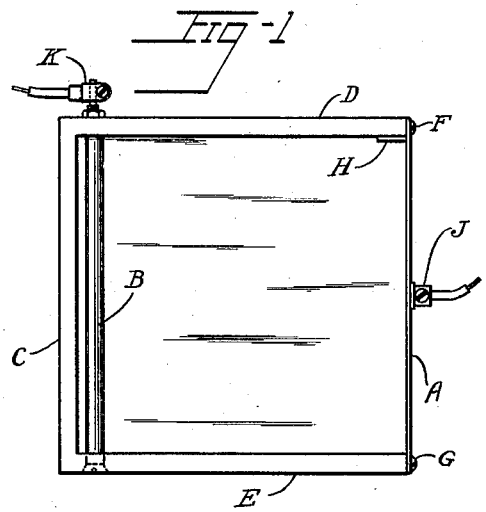
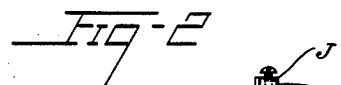
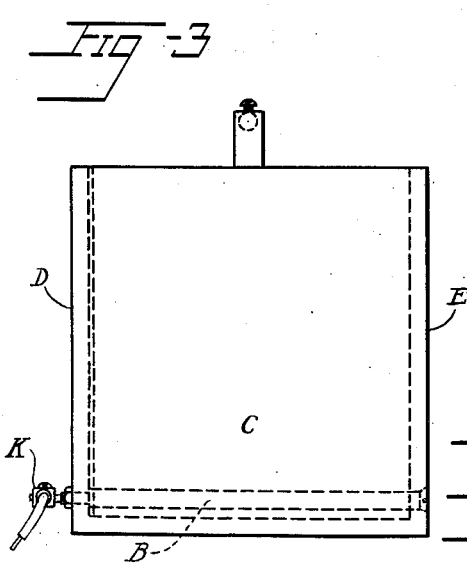
Inventor
Frederick Henry Lane
By Pierson, Eakin & Avery
Attys.

Patented Sept. 8, 1931

1,822,226

UNITED STATES PATENT OFFICE

FREDERICK HENRY LANE, OF ERDINGTON, BIRMINGHAM, ENGLAND, ASSIGNOR TO AMERICAN ANODE, INC., OF AKRON, OHIO, A CORPORATION OF DELAWARE

METHOD FOR DETERMINING OPTIMUM CURRENT STRENGTH IN THE ELECTRODEPOSITION OF RUBBER AND OTHER SUBSTANCES

Application filed April 4, 1928, Serial No. 267,348, and in Great Britain April 6, 1927.

This invention relates to a method and means for determining optimum current strength in the electro deposition of substances from unvulcanized or vulcanized natural or artificial rubber emulsions with or without additional substances, and also to natural or artificial vulcanized or unvulcanized emulsions of other rubber-like substance as for example gutta percha or balata with or without additional substances. The aqueous dispersions may also comprise one or more lattices such as of rubber, gutta percha, balata or similar vegetable resins or artificial dispersions of rubber or similar artificial products such as synthetic resins or of wastes, reclaim rubber substitutes or the like or mixtures of any of said dispersions. The dispersions may be in vulcanized or unvulcanized condition and may contain any one or more of the usual compounding ingredients.

In the process of depositing such substance electrophoretically the strength of the current utilized affects characteristics of the products, for instance, if the current is too weak there results an irregular deposit having a rough surface, while if the current is too strong there is produced a porous deposit whereby the surface is stricted, and between those two extremes lie a strength of current which will produce a perfectly smooth, non-porous deposit.

Hitherto it has been the practise in determining the current required to produce the desired characteristic to make repeated deposits with different current strength until the most suitable is found. It will be apparent that such a process is in many ways wasteful and it is an object of this invention to provide a method and means whereby the optimum current strength required to produce the desired characteristics may be determined with more expedition and efficiency.

According to this invention, therefore, I produce a deposit proportionately varying in its characteristics from one end to the other end, i. e., the deposit varying preferably between extremes of the characteristics hereinbefore referred to and provision being made whereby the current utilized in the production of the said several areas may be determined.

A suitable instrument for carrying my invention into effect comprises an anode in the form of a rectangular plate preferably m.. le from a metal such as zinc and adjacent one end thereof a cathode in the form of a bar extending thereacross. The said electrodes are arranged at a suitable distance apart and insulated one from the other. It will be apparent that the current strength utilized at the end of the anode adjacent the cathode will be greater than that utilized at the end of the anode remote from the said cathode, the difference being occasioned by the difference in the length of the current path in the electrode. Thus, I am enabled to produce a single deposit varying between relatively thick and porous at one end—adjacent the cathode—and thin and irregular at the other end: between the two there being an area of medium thickness and perfectly smooth and non-porous, the said variance being occasioned by the difference in the strength of the current utilized. It will thus be apparent that the said characteristics can be made in themselves to form a measure of the current strength along the anode plate and say, determining the current strength, giving the type of deposit desired, this current determination being preferably indicated on a fixed scale arranged flanking the said deposit on the anode and which scale is to be calibrated by the method hereinafter to be described. As the thickness of a deposit varies for a definite emulsion, solution or dispersion definitely with the current strength utilized for a definite time interval the graduations of the said scale may be readily arrived at. By way of example the following method may be adopted to arrive at the current strength required to produce any given thickness of deposit:—

A metal anode in the form of a cylinder is immersed in a tank containing say, latex and fillers which cylinder is surrounded by another cylinder serving as the cathode. An ammeter is introduced into the circuit and a current is then passed for one minute at a strength of one ampere per square decimeter. The deposit is then dried and the thickness is noted, which thickness let us call $a$. This thickness $a$ is equivalent to a current density of one ampere per square decimeter. The current density indicator hereinafter described in detail is then immersed in the same mixture and a deposit made for one minute on the anode plate, employing a suitable measured current amperage. The deposit formed on this anode plate is dried in a similar manner to which the deposit on the anode cylinder was subjected. The deposit on this anode plate is now gauged at different points along its length. At the point of thickness $a$ the current density can be taken to be one ampere per square decimeter. At the point of thickness $\frac{a}{2}$ the current density must be 0.5 ampere per square decimeter. At a point where the thickness is $2a$ the current density can be taken to be two amperes per square decimeter. In this way the current strength corresponding to various points along its length may be calculated, and thus the scale may be graduated in terms of current strength. In subsequent use the desired characteristic say, of appearance or constitution for any given mix for which the instrument has been calibrated is observed in the deposit and the current strength required to produce that characteristic is indicated on the adjacent scale.

As one modification of the method herein described for the calibrating of the current density indicator it is pointed out that the current density indicator may be connected in series with concentric electrodes of suitable dimensions and a current passed of a strength of one ampere per square decimeter for the cylindrical anode for one minute both the deposits on the respective anodes being dried and compared in the way above described.

There the solutions, dispersions or emulsions worked with are sufficiently close in their chemical and physical properties it may be assumed that the instrument calibrated for one particular mix will give sufficiently accurate results for any mix.

In using this calibrated instrument in order to determine the current density per unit time in order to obtain a desired deposit it is necessary to connect the instrument in series with an ammeter and to pass for a definite time either a current of a strength found suitable in the calibration, or a multiple or submultiple of such a current is passed so that one area of the anodic deposit obtained will have the desired characteristics. In the case where a multiple or submultiple of the current used in calibration is passed the graduations of the current density indicator scale have to be multiplied by the factor easily determined so as to obtain the correct current densities along the scale and in particular the current density giving the desired deposit.

In order that the invention may be clearly understood and readily carried into effect the same is now described with reference to the accompanying drawings, although it will be appreciated that these drawings are given for illustrative purposes and not by way of limitation.

Fig. 1 is a plan of a current density indicator.

Fig. 2 is a side elevation of a current density indicator.

Fig. 3 is an end elevation.

Referring now to Fig. 1 D C and E are the three ebonite sides of the current density indicator box, A being the zinc anode plate which is screwed on at the points F and G to the sides D and E. The cathode bar B is located opposite the lower end of the anode plate A. The anode and cathode are each provided with a terminal, designated respectively as J and K, whereby the depositing current is conducted to the apparatus. A vertical scale H is located adjacent to the anode plate A.

Referring now to Fig. 2 B is the cathode bar of relatively small diameter, H is the scale calibrated so as to allow readings to be obtained in amperes per square decimeter. I is the deposit of rubber or the like. The deposit I is readily examined and compared with the scale H by simply emptying the liquid portion of the dispersion out of the apparatus, exposing the scale and the coagulated deposit.

What I claim is:—

1. A method for determining the optimum current density for the electrodeposition of rubber or rubber-like substances from aqueous dispersions which comprises electrodepositing the said substances from the said dispersions upon a surface over which the current density varies continuously from one end to the other, and determining the current densities on the portions of the depositing surface corresponding to deposits of the desired characteristics.

2. A method for determining the optimum current density for the electrodeposition of rubber or rubber-like substances from aqueous dispersions which comprises electrodepositing the said substances from the said dispersions upon a rectangular anode adjacent to one end of which is located a narrow cathode, so that the current density on the surface of the anode varies continuously from one end to the other in a reproducible manner; and determining the current densities on the portions of the anode corresponding to deposits of the desired characteristics.

3. A method for calibrating apparatus for determining the optimum current density for electrodeposition of rubber, which comprises electrodepositing a layer of rubber from an aqueous dispersion on the anode of the said apparatus with a current density varying continuously from one end to the other of the said anode employing a given constant current, electrodepositing a second layer of rubber at a uniform, known current density for the same length of time, drying the respective deposits, and noting the portion of the anode at which the thickness of the first, non-uniform deposit equals that of the second, uniform deposit.

In witness whereof, I have hereunto signed my name.

FREDERICK HENRY LANE.